Patented Jan. 11, 1944

2,338,802

UNITED STATES PATENT OFFICE 2,338,802

TREATED TURPENTINE COMPOSITION

William E. Decker, New York, N. Y.

No Drawing. Application March 29, 1941,
Serial No. 385,966

16 Claims. (Cl. 106—174)

This invention relates to an oxidized and heated turpentine composition and the method of making it. More particularly, the invention relates to a composition including a cellulose ether and the product of blowing heated turpentine, the cellulose ether being dispersed in the treated turpentine so as to give a thermoplastic and substantially transparent product.

The composition of the invention is particularly adapted for use as an adhesive, as a finishing composition for decorative or protective purposes, in molded plastics, in forming a surface from which rubber compositions molded thereagainst and subsequently vulcanized may be readily separated after vulcanization, and as the laminating material in safety glass.

The invention comprises the composition including a cellulose ether, such as ethyl cellulose, dissolved in the product of blowing heated turpentine with air or other gas containing free oxygen. The invention comprises also the method and the product resulting from blowing turpentine at a temperature of about 240° C. or higher, and bubbling air or oxygen through the heated turpentine. The invention includes, in addition, adhesives, finishing compositions, plastics, and other products described herein that contain the oxidized and heated turpentine and a cellulose ether.

In the practice of the invention, turpentine is heated and blown with air at an elevated temperature adapted to make the turpentine readily oxidizable by free oxygen and cause polymerization, as evidenced by thickening, but below the temperature of objectionable darkening of the turpentine. I have found that particularly good results are obtained when the temperature of treatment of the turpentine is between about 240° and 320° C. and air is passed in finely divided form through the heated turpentine for about 20 to 60 minutes or until the rate of absorption of oxygen by the turpentine becomes relatively slow. Within approximately the ranges stated, longer periods of treatment are used at the lower temperatures and shorter periods at the higher temperatures.

The cellulose ether is introduced into the blown and heated turpentine. The introduction is made preferably in turpentine that has been warmed to about 200° C. or so and blown during the warming period; under such conditions, the cellulose ether dissolves in the heated and agitated turpentine almost at once and without any tendency to settle subsequently or interfere with the free passage or proper distribution of air through the composition. If the cellulose ether is introduced into the raw turpentine, the product is not a good adhesive but is a hazy material that, when cast into a film, is inert and lacking in yieldability. When the ether is dissolved in the partly or completely blown and heated turpentine, on the other hand, the films have excellent adherence to a surface and can be stretched by about 15 to 40% or so without breaking.

When the cellulose ether has been dissolved, that is, dispersed, colloided, or otherwise formed into what appears to be a substantially clear, homogeneous mass, and the turpentine has been blown and heated to the selected maximum temperature and for the time period, as described, there is produced a mass that is syrupy while warm but which, on cooling, increases in viscosity as the temperature falls, and becomes a shape-retaining plastic provided the proportion of cellulose ether present is somewhat in excess of about 5 parts to 100 parts of the treated turpentine.

My compositions so made have remarkable adhesive properties for holding together various objects such as paper, wood, or cloth, are inclined to be stringy, as when touched with an object that is slowly moved away from the composition, and are practically clear, transparent, and tough when cold and in the absence of a softener or volatile solvent, but adapted to be softened by warming to consistency suitable for molding into selected shapes. With a proportion of cellulose ether below 5 parts, the compositions are pourable but characterized by good adhesive and protective qualities.

The explanation of the formation of the tough plastic on cooling of the cellulose ether and blown heated turpentine composition is not known with certainty to me. It seems however, that one cause of this effect is possibly the existence of the cellulose ether in the cooled product in a condition that is on the border line between solubility and insolubility in the treated turpentine medium.

Regardless of the explanation of the cause of the useful properties of my composition, I make use of such properties without restricting myself to any theory of explanation of the results obtained.

The maximum temperature at which the turpentine is blown for a substantial period of time is important.

If such temperature of blowing is not approximately equal to or above 240° C., there is obtained only very limited thickening of the turpentine. Furthermore, when cellulose ether is stirred into turpentine that has been blown only at temperatures below about 240° C. and the resulting composition is allowed to stand at atmospheric temperatures, there is separation into two layers, an upper layer that contains the major part of the cellulose ether and a lower turpentine-like layer.

When, however, the turpentine is blown at temperatures of approximately 240° C. or somewhat higher and the vapors which are removed by evaporation at such temperatures are separated, and suitably condensed as a foreshot, cellulose ether dissolved in the resulting oxidized product does not separate on standing in the cooled condition but, on the other hand, remains indefinitely dispersed in what appears to be a substantially clear, homogeneous solution. Only a moderately conspicuous white haze is present.

The maximum temperature of blowing of the turpentine should be safely below the point at which objectionable discoloration occurs. With most turpentines this is in the neighborhood of 300° C.

The blowing is effected to advantage by passing air or oxygen, preferably air, through fine openings in an air inlet member placed near the bottom of the charge of turpentine, so that the air, as it rises through the turpentine, is in the form of innumerable fine bubbles.

In proceeding as described, there is ordinarily removed a foreshot in amount equal to about 5 to 10% of the total weight of the raw turpentine used.

The blowing of the turpentine at temperatures at or above 240° C. is continued for several minutes after the turpentine, which is heated gradually, has reached the 240° point. Suitably, the blowing is continued for about one-half hour or so after that temperature is reached.

In general, the blowing is conducted for a sufficiently long time to convert the turpentine to the viscous consistency desired, while avoiding objectionable discoloration, and to produce a solution of the cellulose ether in the oxidized turpentine that does not show separation on cooling and standing. Since discoloration increases both with the temperature of blowing and the period of time during which the turpentine is maintained near the maximum temperature of blowing, not only is it desirable to keep the maximum temperature at a point not substantially above 320° C. but also to restrict the time of blowing at the maximum temperature to about 30 minutes or so. If the temperature is maintained considerably below 300° C., say at 250 to 280° C., then longer times of blowing are satisfactory.

In making large batches of my composition, it is desirable to remove test specimens from time to time and cool them to approximately room temperature, before the entire batch is finished, so as to make certain that the blowing has been continued long enough to convert the turpentine to a product that remains homogeneously associated with the cellulose ether at ordinary temperatures and in a solution of the desired viscosity or firmness, if a gel.

To decrease the likelihood of discoloration and at the same time ensure elimination from the turpentine of low boiling materials in desired amount, the blowing may be conducted at reduced pressure, say, at a pressure corresponding to one-half to three-quarters of an atmosphere or so and at temperatures that, at the maximum, are about 20° C. lower than those stated above.

After the turpentine is oxidized, that is, thickened to the extent desired, the resulting composition may be cooled and used for one of the purposes to be described.

In uses requiring the application of the composition at relatively low viscosity, a solvent is incorporated. This incorporation of the solvent is effected to advantage after the heated composition, including the oxidized turpentine and dissolved cellulose ether, has cooled to a temperature approximately to or slightly below the boiling point of the selected solvent. The solvent may then be stirred into the said composition, whereupon the solvent dissolves slowly. In the preferred practice, the partially cooled batch of blown turpentine and cellulose ether is introduced, in the form of a small stream, into the entire mass of the selected solvent, stirring being effected during the addition. In this latter manner, there is obtained relatively quick solution of the heated composition in the solvent, particularly up to the time when most of the composition has been added and the resulting solvent-diluted composition becomes somewhat concentrated.

As to proportions, the air or oxygen passed through the boiled turpentine during the blowing is in excess of that which is retained by the turpentine. The passage of the gas through the turpentine is continued until the rate of absorption of gas becomes slow or until the consistency of the oxidized product is found, upon cooling a test specimen, to be that desired.

The proportion of cellulose ether used is varied according to the consistency desired in the finished solution of the ether in the blown turpentine. The proportion of about 8 to 20 parts of the cellulose ether for 100 parts by weight of the cellulose ether and treated turpentine is preferred for most purposes. Such a proportion gives gels that are not flowable at room temperatures. In fact, the use of 20 parts of the cellulose ether gives a solid of hardness when cold and in the solvent-free condition that is about the same as rosin.

For a composition of about the consistency of a lacquer for spraying, there is used 5 parts or so of the cellulose ether in addition to a small proportion of volatile solvent for 100 parts of the cellulose ether and treated turpentine. The proportion of cellulose ether may be increased from this small percentage up to about 30 parts to 100 parts of the cellulose ether and treated turpentine, the latter proportion, in the absence of a softener or solvent, giving a product that solidifies to a shape-retaining mass even when warm and that is a resilient solid when cold.

As the solvent to dilute the cellulose ether and oxidized turpentine composition for purposes requiring thinned compositions, there may be used to advantage volatile hydrocarbon solvents, as, for example, cleaners' naphtha, v. m. and p. naphtha, toluene or xylene. In some instances, benzene may be used although it is not as satisfactory as the other hydrocarbons listed, because of the toxicity and objectionable odor of benzene and the fact that benzene dissolves the cellulose ether and oxidized turpentine composition rather slowly. Esters and ketones, such as butyl or amyl acetate and acetone, may be used for some purposes, although they are not as satisfactory as the hydrocarbons.

The volatile solvent may be varied in proportion in accordance with the consistency desired in the solvent-diluted composition. Thus, with 10 to 20 parts of ethyl cellulose to 100 parts of the cellulose ether and oxidized boiled turpentine, there may be used 1 to 2 parts of the solvent to one of the non-volatile, film-forming ingredients (cellulose ether and oxidized turpentine) in the composition. The proportion of solvent for use in adhesives such, for instance, as a household cement or dry mounting tissue for photographs, is suitably about 1 part of solvent to 3 parts of the cellulose ether and oxidized turpentine.

While ethyl cellulose is particularly suitable as the cellulose ether in compositions of the kind described, there may be used other cellulose ethers that are soluble in the oxidized boiled turpentine. Thus, there may be used the propyl or butyl ether, substituted pound for pound for the ethyl cellulose in the compositions described herein. The methyl ether should not be used when a clear composition of substantial concentration of the ether is required. Cellulose esters such as nitrate and acetate cannot be used in place of the cellulose ethers for the present purpose.

As the turpentine, I have used, for instance, the varieties obtained by tapping long leaf southern pine and by distillation of pine stumps. With most turpentines of commerce, the removal of a foreshot is not required. The turpentine is ordinarily oxidized by me until it contains about 7 to 15% of oxygen.

The percentage of alkoxy groups in the cellulose ether should be at least approximately 36. For making tough plastics and adhesives of high strength of film, there is used ethyl cellulose containing 42 to 52% of ethoxy groups and preferably approximately 48%. Such high percentages of ethoxy groups promote clarity and reduce the amount of uncolloided material noted in the compositions with the treated turpentine.

To increase the flexibility of the composition, there may be used a non-volatile softener or plasticizing agent such as dibutyl phthalate, castor oil, or a mineral oil, used in proportion to the plasticizing effect desired, say, to the extent of about 5 to 20% of the non-volatile materials in the composition.

To increase the hardness or resiliency of the composition, there is incorporated a resinous hardening agent such as resin that is soluble in the composition. Thus there may be used ester gum, rosin, or dammar resin. The proportion of these hardness-increasing agents is varied in accordance with the extent of the hardening effect desired, but is ordinarily about 10 to 50% of the non-volatile material present in the composition.

Water-repellent agents may be incorporated to improve the water-shedding properties of the composition and prevent entrance of water into the film on long contact with water. Water-repellent agents that are satisfactory for the purpose include the water-insoluble soaps, such as the salts of aluminum, calcium, or zinc with the higher fatty acids. Commercial aluminum stearate is preferred because of its effectiveness and the fact that it may be readily suspended or colloided in the composition. Proportions of the water-repellent agents used are of the order of 1 to 10 parts for 100 parts of non-volatile material present, the proportion varying in general with the thoroughness of the water-proofing effect sought.

When it is desired to produce a composition that, after evaporation of volatile solvent or cooling to ordinary temperatures continues to harden at a relatively rapid rate, there is introduced a small proportion of a paint drier, as, for example 0.1 to 0.3% of cobalt or nickel salts of oleic or linoleic acid or other conventional driers, these materials serving to promote thickening of the blown turpentine on standing in contact with air.

The selected drier in about the proportions stated may be incorporated into the turpentine after the treatment by blowing and heating is completed. For some purposes, however, the incorporation into the turpentine may be made before blowing or during blowing, so as to make possible the bodying of the turpentine in a shorter period of time or at a lower temperature than is otherwise possible.

When, on the other hand, it is desired to decrease the change in consistency or hardness or solubility of my composition after it is once set, there are incorporated anti-oxidants such as resorcinol, triethyl lead phenolate, and an aromatic amine suitably in the proportion of about 0.01 to 0.05 part for 100 parts of non-volatiles in the cellulose ether and blown turpentine composition.

Other admixtures that may be added are pigments to establish color desired or dyes, preferably oil- or alcohol-soluble dyes.

In making a dry mounting tissue for photographs on paper, for example, there is formed a solution of cellulose ether and blown heated turpentine in one of the hydrocarbon solvents mentioned, the solution containing for instance 40 to 75% of non-volatile material. This solution is applied to the back of the photograph, as by spraying or brushing, and the solvent allowed to evaporate. The coated side of the photograph is then pressed at an elevated temperature against the base upon which the photograph is to be mounted, as, for instance, with a hot iron. There is thus produced an excellent, smooth and permanent mounting.

In making a finishing composition, the cellulose ether and blown turpentine composition is diluted with solvents of kind and in amount to give the desired rate of evaporation and the desired concentration or consistency of the composition for application as a coating. Thus, my composition is diluted with toluene, xylene, or a volatile petroleum hydrocarbon, to a consistency suitable for application by spraying, brushing, or dipping. An advantage in my composition is the fact that a large concentration of non-volatile or film-forming material may be present at such consistencies, say from 25 to 75% of the total weight of the solution. The material dries quickly to tack-free condition on evaporation of the solvent. Because of the relatively low proportion of solvent present, the composition shows a minimum of shrinkage on evaporation of the solvent. Furthermore, the composition, after the evaporation of the volatile solvent, adheres firmly to wood, metal, cloth, or the like and is substantially free from chalking on long exposure to sunlight.

A finishing composition of the kind described is particularly useful in providing a yieldable, resilient undercoating for adhering together materials that show unequal expansions on exposure to varying conditions of temperature or humidity, as, for example, for adhering the finishing coats of lacquer to the sanding primer coat or to wood, metal, or like material being decorated.

The finishing compositions are particularly useful in connection with bronze powder lacquers, that is, those containing flakes of aluminum bronze or the like. Such powders incorporated into my composition remain for long periods of time without gelling or tarnishing, the cellulose ether and blown linseed oil composition providing an excellent non-corrosive and protective medium that is not subject to objectionable gelling.

In making a decorative material for applying a pearly finish to articles, flakes of pearly lustre, such as those from the bleak fish in substantially anhydrous condition, are suspended in a flowable solution of the cellulose ether and blown turpentine. Particularly satisfactory results at reasonable cost have been obtained when guanine crystals are used to provide the flakes of pearly lustre. Thus, I incorporate about one half to two parts of guanine into my composition for 100 parts of non-volatile material in the presence of volatile solvent, if desired to reduce the viscosity, and use the resulting mixture as a pearly lacquer or plastic.

In connection with the use of guanine or the like in a coating composition, I have found particular advantage in the use of aluminum stearate in small amount, say, 0.3 to 2 parts for 100 parts of the pearly coating composition. The aluminum stearate promotes evenness of spacing of the lustrous particles and desirable orientation of the said particles, so that in a film, dried from a volatile solvent solution of the non-volatile materials, the guanine flakes come to be arranged predominantly with their flat faces exposed to view.

In making a molding plastic there may be incorporated into the cellulose ether and blown turpentine composition usual plastic fillers, as, for example, talc, wood flour, asbestos fines, whiting or the like. Thus, I have used to advantage wood flour in the proportion of 1 to 3 parts by volume to 2 parts of the said composition. Plastics so made, warmed to the temperature of softening, say to about 70 to 110° C., and then shaped and cooled show no appreciable shrinkage during setting and cooling. They may be molded in any convenient manner at an elevated temperature above the softening point of the composition and then cooled before being removed from the mold. The plastic compositions are particularly suitable for use in injection molding.

In the use of my composition in shaping rubber products, the composition is applied over a form as a thin film, as by evaporation in situ of a solution in a volatile solvent. After the composition has set to non-flowable condition, the form is then dipped into a rubber material, say, into latex containing usual compounding ingredients. The form is then withdrawn and the coating of rubber is dried and stripped from the form. Likewise my composition may be used to advantage in coating dies in which rubber compounds are shaped and subsequently vulcanized. After vulcanization, the rubber compound separates particularly easily from the coated dies.

The composition is particularly satisfactory in the lamination of glass to make safety glass. For this purpose, the composition including the cellulose ether and treated turpentine is applied to one face of a sheet of glass and a second sheet of glass is pressed firmly against the composition supported on the first sheet. Thus, a preformed film of the composition in plastic form may be laid over the first sheet of glass and the other glass sheet then pressed against the film to cause consolidation. Or, the composition may be dissolved in a volatile solvent of the kind described and flowed or sprayed as a moderately heavy coating upon one sheet of glass. The solvent is then evaporated and the second piece of glass is applied under pressure, as stated.

For some purposes it is desirable to make the consolidation at a temperature above the melting point of the plastic in substantially solvent-free condition. Thus the final assembly may be made at a temperature of about 150° to 200° C. or somewhat higher, the temperature used being moderately above the softening point for the particular plastic composition used. After the second sheet of glass has been pressed against the softened plastic on the first sheet, the whole is subjected to cooling to set the plastic before the pressure is relieved.

The apparatus for heating and compressing the assembly and also for cooling under pressure, may be that which is conventionally used in making safety glass, only the temperature of the heating and cooling being varied if necessary from those temperatures now used with other plastic material.

In the use of my composition as a laminating material for safety glass, several advantages are realized. My composition remains yieldable at all temperatures to which the safety glass is ordinarily exposed. It is not objectionably soft in summer or brittle at winter temperatures. It adheres uniformly to the glass and has an index of refraction that closely approximates that of glass. It is easy to apply. During the consolidation with the two sheets of glass, it flows readily and smoothly over the surfaces of the glass. My composition is not subject to appreciable discoloration or checking on exposure to light.

If the haze in my substantially clear solution is objectionable for use in making safety glass or for other purposes, then I incorporate in the composition a plasticizing resin or a non-volatile plasticizer of high oxygen content, as, for example, glycerine or glycol phthalate or maleate, one of the alkyd resins that is soluble in hydrocarbon solvents and also is a solvent for my cellulose ether and treated turpentine composition, or the phthalate or maleate of such a glycol ether as the methyl or ethyl ether of ethylene glycol. The haze-diminishing material so incorporated is used in the proportion of about 5 to 25 parts for 100 parts of non-volatile material in the composition.

When my compositions are formed into films, as by being applied in a solution in a volatile solvent and the solvent then evaporated, substantially clear compositions of strong adhesive properties result. As molded plastics, they are subject to yielding before breaking. Furthermore, they are resistant to caustic alkali solutions; a 5% aqueous solution of sodium hydroxide maintained at the boiling temperature does not decompose the films or articles appreciably in 15 minutes. Although soluble as made in toluol and like hydrocarbon solvents, the solubility in such solvents decreases as the composition in substantially solvent-free condition ages in contact with air. Thus a film of the cellulose ether and treated turpentine composition formed by evaporation of a hydrocarbon solution of the composition slowly decreases in solubility in the said solvent with age. Likewise, a molded plastic that, when first formed is soluble in toluene or xylene, and then is allowed to stand in contact with air for a few weeks comes to have a surface that is practically undissolved on contact with toluene or xylene for a moderate period of time. Exposure of the composition to ultra-violet light accelerates the change of the composition to the less soluble condition.

Because of the properties of my composition, it is useful also in crystallizing lacquer. In making such a lacquer, the ingredients are combined and formed into film on the surface that is to be given a coating of crystallizing lacquer. Once the film has dried, then a protective coating is formed over the said film, without dissolving the film even though the protective coating is applied in a volatile liquid medium that is a solvent for the cellulose ether and treated turpentine composition originally used in the crystallizing lacquer film.

In more detail, a typical crystallizing lacquer and the method of applying it are as follows:

A pound of salicylic acid and 1 ounce of a mixture in equal parts by weight of crystalline guanine and barium thiosulfate are added to 1 gallon of the blown heated turpentine and cellulose ether diluted with amyl acetate to viscosity suitable for application. The lacquer so made is then applied, as by spraying, brushing, or dipping, to the object to be finished and the amyl acetate allowed to evaporate. The crystal patterns appear as the solvent evaporates.

By touching the composition with a solid object at various points, during the evaporation of the solvent and at a time when the viscosity of the evaporating layer has become so great that the effect of the touching is not quickly obliterated, points of crystallization are established that tend to control generally the foci of crystallization.

After the drying of the crystallizing lacquer is completed, a period of a day or so is allowed to lapse, so that the cellulose ether and treated turpentine composition becomes insoluble or only very slowly soluble in hydrocarbon solvents. Over the film there is then applied a finishing coat, such as a solution of the cellulose ether and treated turpentine composition in one of the hydrocarbon solvents previously mentioned.

Variations may be made in the composition of the crystallizing lacquer and protecting coating. The guanine may be omitted if the pearly effect is not desired.

In place of the salicylic acid, there may be used other conventional ingredients that are or have been used as the crystallizing ingredient of crystallizing lacquers as, for example, naphthalene, phthalic anhydride, or the like.

Instead of the amyl acetate, there may be used another volatile solvent of evaporation rate selected to give the desired quality of the crystals obtained in the film. Thus, there may be used butyl acetate or hexyl acetate, either alone or mixed with a certain proportion of xylene, toluene or the like, all in accordance with usual practice. The lower boiling and the faster the evaporating rate of the solvent mixture used, the smaller will be the crystal groups obtained and vice versa.

The proportion of volatile solvent may be varied, depending upon the consistency desired at the time of application and thickness of film to be produced. Thus, the volatile solvent may be used in the proportion of about 2 to 4 times the volume of the non-volatile materials present.

In place of the cellulose ether and treated turpentine composition used to provide the protective coating over the crystallized lacquer film there may be used a solution of a phenolaldehyde resin in a usual volatile solvent for such material, a polymerized vinyl compound of resinous consistency in ketone solvents, or methacrylate resin in mono-methyl methacrylate as solvent.

Compositions of the kind described not only have properties adapting the composition to a wide variety of uses but also are economical in cost and convenient in manufacture and use.

While I have described my invention as consisting primarily of a major proportion of blown turpentine and a minor proportion of cellulose ether, nevertheless, if the characteristics of the cellulose ether are to be maintained predominant, these proportions may be greatly modified, for apparently the properly blown turpentine and the cellulose ether may be compounded in substantially any proportion. Since the blown turpentine is much the cheaper of the two ingredients commercially, it will normally be kept as the major ingredient. While the nature of the mixture will vary according to the predominating ingredient, my investigations seem to indicate that these two substances do not form a simple mixture but are so integrated or colloided that the combined material has qualities which are more than merely the sum of the properties of the two ingredients.

Likewise, the temperature of blowing may be varied considerably, as from 200° C. up to the point of objectionable discoloration of the turpentine and cellulose ether composition. If, however, the oxidized and heated turpentine composition is to have gummy properties, to string out when touched with a rod which is subsequently withdrawn, to be non-tacky when cold, or, once set, to be not quickly soluble in hydrocarbon solvents, when the cellulose ether content is at least 10%, then the blowing must be effected at a temperature of at least approximately 240° C. and preferably at about 240° to 260° C.

In blowing at such temperatures, the turpentine may be confined under pressure in a tank provided with a pressure release valve. The use of pressure above atmospheric is ordinarily not necessary, however. As the blowing is begun in the warm turpentine and continued as the temperature is raised gradually up to and past the normal boiling point, the mixture of treated turpentine and cellulose ether shows a vapor pressure that is much below that of the original turpentine. Even when the turpentine and cellulose ether composition is blown at a maximum temperature of 240° to 260° C. or somewhat higher, the amount of turpentine lost is considerably less than the amount of oxygen absorbed, the composition being increased in net weight by the blowing and heating.

It will be understood that the details given are for the purpose of illustration and that variations within the spirit of the invention are intended to be included within the scope of the appended claims.

What I claim is:

1. A composition of matter comprising a cellulose ether and oxidized and polymerized turpentine, the oxidized and polymerized turpentine being the product of blowing turpentine with a gas containing free oxygen for at least 20 to 60 minutes at a temperature between the initial boiling point of the turpentine and the temperature of excessive discoloration of the turpentine, and the cellulose ether being dispersed in the oxidized and polymerized turpentine, so as to form a substantially transparent and homogeneous, thermoplastic material.

2. A composition of matter comprising ethyl cellulose containing approximately 42 to 52 per cent of ethoxy groups and blown and polymerized turpentine containing about 7 to 15 per cent of oxygen, the blown and polymerized turpentine being the product of blowing turpenttine with a gas containing free oxygen for a period of at least 20 to 60 minutes at a temperature of 220 to 300° C., the cellulose ether being present in the proportion of about 5 to 30 per cent of the said composition and being in dissolved condition.

3. A composition as described in claim 1 including a volatile solvent for the thermoplastic material, the solvent converting the said material to a flowable solution adapted to set to shape-retaining form on evaporation of the solvent.

4. A composition as described in claim 1 including a hardening agent dissolved in the said composition and increasing the hardness of the composition when in set condition.

5. A composition of matter comprising a solution of a cellulose ether in the product of blowing turpentine at a maximum temperature of about 240° to 300° C. for at least 20 to 60 minutes with air, the solution being substantially transparent and homogeneous and non-segregating on standing.

6. A composition of matter comprising a bodied turpentine having the power to dissolve ethyl cellulose to form a substantially transparent and homogeneous mass that does not separate into layers on standing at atmospheric temperatures, the bodied turpentine being the product of blowing turpentine at a temperature of about 240° to 300° C. with a gas containing free oxygen for at least 20 to 60 minutes.

7. An adhesive including cellulose ether and the product of oxidizing heated turpentine by blowing it at a temperature of about 220 to 300° C. for 20 to 60 minutes with a gas containing free oxygen, the cellulose ether being dissolved in the said product to form a composition of high adhesive strength.

8. An adhesive as described in claim 7 including a volatile solvent reducing the viscosity of the adhesive composition, the composition being adapted to set to a plastic adhesive mass upon evaporation of the volatile solvent.

9. A material for decorative purposes including the composition as described in claim 1, a volatile solvent medium for the composition, aluminum stearate and suspended pearly particles of guanine, the particles of guanine being spaced from each other and the aluminum stearate serving to promote desired arrangement of the said particles as the solvent evaporates and the composition is set.

10. A plastic comprising the product described in claim 1 and particles of inert filling material distributed substantially uniformly therethroughout, the composition being plastic and readily moldable when warm and tough and shape-retaining when cold.

11. A finishing material comprising the composition described in claim 1 and bronze powder dispersed therein, the said composition providing a non-corroding medium for the bronze powder and the composition on standing remaining indefinitely in non-gelled condition.

12. The method of making an oxidized and polymerized turpentine which comprises heating turpentine to the temperature of initial boiling and passing air through the heated turpentine so that the turpentine is oxidized and thickened at a temperature at least equal to the initial boiling point for at least 20 to 60 minutes.

13. The method of making a thermoplastic material which comprises oxidizing heated turpentine by blowing an oxygen containing gas through the turpentine at a temperature between the initial boiling point and 300° C. for a period of at least 20 to 60 minutes and dissolving a cellulose ether in the oxidized and heated turpentine, so as to form a transparent homogeneous composition.

14. The method of making a thermoplastic composition which comprises heating turpentine to distil a foreshot therefrom, blowing through the heated turpentine at a temperature between 200° C. and the temperature of discoloration of the turpentine by heating and for a period of at least 20 to 60 minutes a gas containing free oxygen, and dissolving cellulose ether in substantial proportion in the heated and blown turpentine.

15. A finishing material comprising the composition described in claim 1 and a volatile solvent converting the composition to readily flowable condition.

16. A finishing material comprising the composition described in claim 1, a volatile solvent converting the composition to readily flowable condition, a dissolved crystallizing ingredient adapted on evaporation of the solvent to form crystals, and suspended particles of guanine serving to give a pearly effect to the finishing material after evaporation of the volatile solvent.

WILLIAM E. DECKER.